United States Patent
Preisig et al.

(10) Patent No.: US 10,927,950 B2
(45) Date of Patent: Feb. 23, 2021

(54) SHIFT-BY-WIRE SHIFT UNIT FOR SHIFTING A TRANSMISSION OF A VEHICLE

(71) Applicant: Kongsberg Automotive AB, Mullsjö (SE)

(72) Inventors: Nicolas Preisig, Oslo (NO); Andreas Persson, Jönköping (SE)

(73) Assignee: Kongsberg Automotive AB, Mullsjö (SE)

( * ) Notice: Subject to any disclaimer, the term of this patent is extended or adjusted under 35 U.S.C. 154(b) by 421 days.

(21) Appl. No.: 15/748,480

(22) PCT Filed: Jul. 1, 2015

(86) PCT No.: PCT/EP2015/064952
§ 371 (c)(1),
(2) Date: Jan. 29, 2018

(87) PCT Pub. No.: WO2017/001006
PCT Pub. Date: Jan. 5, 2017

(65) Prior Publication Data
US 2018/0223988 A1    Aug. 9, 2018

(51) Int. Cl.
*B60K 6/00* (2006.01)
*G05G 9/00* (2006.01)
(Continued)

(52) U.S. Cl.
CPC ......... *F16H 59/12* (2013.01); *F02N 11/0803* (2013.01); *F16H 59/08* (2013.01);
(Continued)

(58) Field of Classification Search
CPC .... F16H 2059/081; F16H 59/08; F16H 59/12; F02N 11/0803
See application file for complete search history.

(56) References Cited

U.S. PATENT DOCUMENTS

| 2003/0029261 A1* | 2/2003 | DeJonge | B60K 37/06 |
| | | | 74/335 |
| 2011/0025488 A1* | 2/2011 | Leon | F16H 59/08 |
| | | | 340/456 |

(Continued)

FOREIGN PATENT DOCUMENTS

| DE | 102009039113 A1 | 3/2011 |
| JP | 2007253912 A | 10/2007 |
| KR | 20130015362 A | 2/2013 |

OTHER PUBLICATIONS

International Search Report for International Application No. PCT/EP2015/064952 dated May 18, 2016, 6 pages.
(Continued)

*Primary Examiner* — Jake Cook
(74) *Attorney, Agent, or Firm* — Howard & Howard Attorneys PLLC (57) ABSTRACT

A shift-by-wire shift unit for shifting a transmission of a vehicle between R, N, D and P states includes a mono-stable selector element that can be moved in opposite directions. The transmission states R and D can be reached by moving the selector element horizontally from the mono-stable position in a first and a second, opposite direction, respectively. The shift unit also includes a separate input element for changing to transmission state N. The transmission state is changeable from D to R directly by moving the selector element in the first direction, and from R to D directly by moving the selector element in the second direction. The selector element also includes a button element, and the shift unit is arranged such that, when the vehicle is at rest and the transmission is in D or R, actuating the button element effects a change to the transmission state P.

16 Claims, 5 Drawing Sheets

(51) Int. Cl.
*F16H 59/12* (2006.01)
*F16H 59/08* (2006.01)
*F02N 11/08* (2006.01)
*F16H 63/42* (2006.01)

(52) U.S. Cl.
CPC ....... *F16H 63/42* (2013.01); *F16H 2059/081* (2013.01); *F16H 2063/423* (2013.01)

(56) References Cited

U.S. PATENT DOCUMENTS

| | | | |
|---|---|---|---|
| 2011/0219901 A1* | 9/2011 | Giefer | F16H 59/08 74/473.3 |
| 2012/0143409 A1 | 6/2012 | Curtis et al. | |
| 2013/0220055 A1 | 8/2013 | Curl | |
| 2016/0138705 A1* | 5/2016 | Kim | F16H 59/08 74/473.2 |

OTHER PUBLICATIONS

English language abstract for DE102009039113A1 extracted from espacenet.com database on Jul. 19, 2018, 2 pages.
English language abstract for JP2007253912A extracted from espacenet.com database on Jul. 19, 2018, 1 page.
English language abstract for KR20130015362A extracted from espacenet.com database on Jul. 19, 2018, 1 page.

\* cited by examiner

SHIFT-BY-WIRE SHIFT UNIT FOR SHIFTING A TRANSMISSION OF A VEHICLE

This application is the National Stage of International Patent Application No. PCT/EP2015/064952, filed on Jul. 1, 2015, the content of which is incorporated herein by reference.

The present invention relates to a shift-by-wire shift unit for shifting a transmission of a vehicle between R, N, D and P states, including a mono-stable selector element that can be moved in opposite directions, wherein the shift arrangement is arranged such that the transmission states R and D can be reached by moving the selector element horizontally from the mono-stable position in a first direction and in a second, opposite direction, respectively, and including a separate input element for change to transmission state N.

Traditional shift units utilize a pivotal shift lever which can be pivoted along a shifting gate including positions corresponding to the transmission states P, R, N and D. Such traditional shift units can be replaced in shift-by-wire shift units by units comprising a joystick or a rotary knob which can be rotated between positions corresponding to P, R, N and D. All these shift units have in common that there is an intermediate shift position corresponding to N between the shift positions associated with the transmission states R and D. However, this is rather inconvenient because the transmission state N is in fact only needed in rare situations, whereas shifting from D to R via the intermediate N or vice versa is inconvenient when parking the vehicle or getting out of a parking space which may require several changes from D to R and vice versa.

With conventional shift units the automotive industry has to comply with legal or regulatory rules carefully, and there are also rules that govern the arrangement of the PRND states. These standards or rules are reasonable safety measures for traditional, cable actuated shift systems. However with the adoption of shift-by-wire control where software can be utilized to guaranty a save shift system performance, the traditional regulations with respect to the PRND arrangement may be counterproductive with respect to a save, intuitively operable interface between driver and vehicle. Considering performance aspects of shift units measurement factors can be established, such as number of mode errors made by a, for example, first time user, number of glances and glance time (time with eyes-off-the-road) per shift operation, etc. In the cause of the present invention the inventors have found evidence through field research that the rotary input method is very intuitive as such with a strong ergonomic advantage for automatic transmission systems; on the other hand a straight forward adoption of the PRND arrangement is not optimal due to the cognitive load during usage. This has been observed in particular in cases when users have to change between too extreme states (i.e. from D to R or R to D). Therefore, considering the advantage of software control and stage dependent control that applies to shift-by-wire systems it is actually justified to optimize the design for optimal performance with a minimum of operation errors made by drivers, rather than to design shift systems complying with the traditional norms and regulations which are based on the intrinsic nature of mechanical, cable actuated shift systems.

Figure 5:
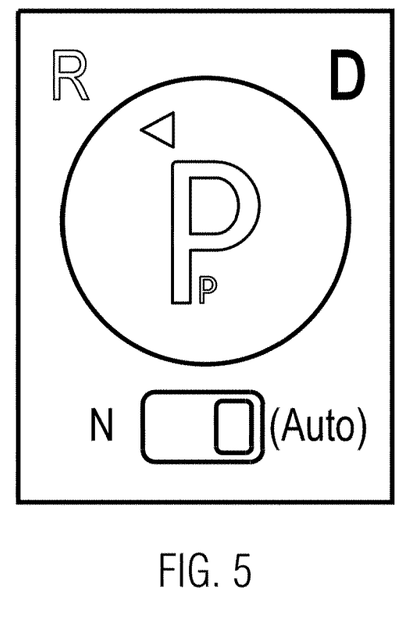

A shift-by-wire shift unit according to the preamble of claim 1 is disclosed in DE 10 2009 039 113 A1. The shift unit comprises a selector element, for example a mono-stable shift lever which may be moved forward to change to the transmission state R, and which may be moved backward from the mono-stable position to change to the transmission state D. In addition there is a separate input element for changing to the transmission state N. There is further embodiment disclosed in FIG. 5 showing a shift unit including a mono-stable rotary knob which may be rotated from the mono-stable position in anti-clockwise and clockwise direction to reach the transmission states R and D, respectively. In addition, the rotary knob is arranged to be vertically displaceable, wherein the rotary knob acts on a separate button when the rotary knob is depressed such that the transmission can be changed to transmission state N by depressing the rotary knob. According to claim of this document the shift unit is arranged such that a change from the transmission state D to the transmission state R or vice versa is possible only if transmission state N is selected before. This means that transmission state R can only be reached from transmission state D via the intermediate transmission state N, and vice versa.

It is an object of the present invention to provide a shift-by-wire shift unit that may be operated in a simple, intuitive and comfortable manner. There is a constant need of saving space and parts in vehicles. Thus, in addition, it would be advantageous to integrate additional functions to the shift unit whilst conveying to the user in an intuitive way how to operate the shift-by-wire shift unit.

This object is achieved by a shift-by-wire shift unit comprising the features of claim 1. Preferred embodiments are set out in the dependent claims.

According to the present invention the shift unit is arranged such that the transmission state is changeable, when the vehicle is at rest, from D to R directly by moving the selector element in the first direction, and from R to D directly by moving the selector element is the second opposite direction, respectively. Furthermore, the selector element includes a button element that can be actuated by the driver. The shift unit is arranged such that, when the transmission is in D or R and the vehicle is at rest, actuating the button element effects a change to the transmission state P.

In a preferred embodiment the button element is a vertically depressible, mono-stable push-button provided on the selector element.

In an alternative embodiment the button element is provided by arranging the selector element as a whole as a vertically depressible mono-stable push-button.

In a further alternative embodiment the button element is formed by a touch screen area on the upper surface of the selector element, wherein the touch screen element is actuating by touching it with one or more fingers.

In a preferred embodiment the shift unit is further arranged such that, when the engine for driving the vehicle is turned off, actuating the button element is starting the engine, and, when the transmission state is P and the engine is running, actuating the button element is turning off the engine.

In a preferred embodiment a top surface of the selector element is provided with a display, and the shift unit is arranged to display a large symbol P when the engine is running and the transmission state is P, and to display a small symbol P, when the transmission state is R, D, or N and the car is at rest with the engine running, to indicate that the transmission state can be changed to P by depressing the selector element.

In a further preferred embodiment the shift unit is arranged to display, when the transmissions state is P and the engine is running, on the display a first arrow pointing in the first direction to a symbol R next to the selector element, and to display a second arrow pointing in the second direction to a symbol D next to the selector element to indicate that the transmission state can be changed to R and D by moving the selector element in the first and second direction, respectively.

In a preferred embodiment shift unit is arranged such that the button element for changing to P has the further function to allow to turn the engine on and off, respectively, by actuating the same button element when the shift unit is in P and the engine is off and on, respectively. In this manner no further input element is need for starting or stopping the engine.

In a preferred embodiment the shift unit is arranged to display a start symbol on the display when the engine is turned off to indicate that depressing the selector element is available to start the engine, and to the display a stop symbol on the display when the transmission state is P and the engine is running to indicate that depressing the selector element is available for turning off the engine.

To provide a display on the top surface of the selector element and utilizing it for dynamically give information on the state of the shift unit and on the way the selector element is to be operated to reach certain shift states has several advantages. By moving the feedback information to a display on the selector element otherwise unused space on the selector element can be used for the purpose of conveying visible feedback information to the driver. In this manner space around the selector element can be saved compared existing devices that use space around the shift unit for a display, icons, or LEDs. Of course, the visual feedback information can also be shown on the dashboard, the central display or could be projected to the windshield window.

In a preferred embodiment the selector element is a rotary knob which can be rotated from the mono-stable position in clock-wise and anti-clockwise direction to perform the horizontal movements in the first and in the second, opposite direction, respectively.

In an alternative embodiment the selector element is a shift button that can be shifted linearly in opposite directions from the mono-stable position in order to perform the horizontal movements in the first and in the second, opposite direction, respectively.

The present invention permits to realize several advantages. There is always a desire to save space in a car. Thus, there is a need to remove active buttons and controls. The present invention allows to integrate several functions into the shift unit for which previously several separate input means were needed.

The adoption of auto-return to P of the transmission when the engine is turned off makes many drivers feel insecure whether they really can leave the car. Many drivers find it irritating that they might have forgotten to put the shifter in P before turning off the vehicle. By designing the shift-by-wire input unit in such a manner that a user has to effect turning off of the engine (OFF function) by the same input means as for changing to P, it can be achieved that the user has to go through P by one actuation of the input means and then turn off the engine by actuating the same input means once more. In this manner the driver intuitively gets feedback that the vehicle is in P when the engine is turned off.

Along the same lines, turning on and off a vehicle is most likely followed with either driving the vehicle in some direction or put it in P (before turning it off). Thus, ON and OFF functions are directly related to the shift functions. Still, in present cars there is a separate button for it or a start key lock.

Furthermore, rotary knob shift-by-wire designs have shown very promising results. However, one mistake that was made over and over again was having the middle position N in the shift pattern R N D when the driver wanted to go from D→R or R→D. In such sequence there is really no need to have N in the middle, and in addition, N is used very rarely. In the present invention the selector element is a double mono-stable button which allows, in a first movement direction from the mono-stable position, to change between R and D and vice versa, and in a second movement direction from the mono-stable direction to change to P. In preferred embodiment actuation of the selector element in the second direction can also be used to start and turn off the engine of the vehicle.

The present invention will now be described in connection with a preferred embodiment show in the drawings in which.

The shift-by-wire shift unit of the preferred embodiment presented here comprises as selector element a mono-stable rotary knob 2, and as further input element a mono-stable shift button 4. The rotary knob 2 and the shift button 4 are provided on a base which can for example be fixed on a middle console of a vehicle.

In the illustrated preferred embodiment the button element of the selector element is provided by arranging the rotary knob as a whole as a vertically depressible, mono-stable push-button. However, in principle the button element of the selector could also be a separate extra element provided on the selector element, for example provided as a further button on the rotary knob 2, or by a touch screen element provided on the rotary knob.

Figure 1:
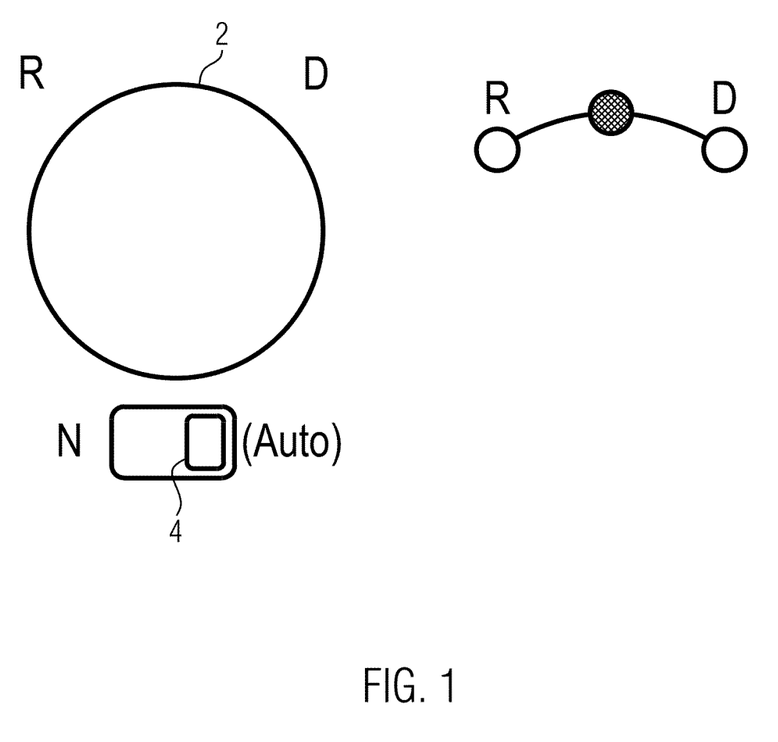
FIG. 1 is a schematical plan view of a shift-by-wire shift unit according to an embodiment of the present invention, together with a schematical representation of the shift pattern.

The shift pattern of the rotary knob 2 is schematically indicated in FIG. 1 on the left hand side. From the mono-stable central position the rotary knob can be rotated in a first, anti-clockwise direction to change the transmission state to R, and from the mono-stable central position in a second, clockwise direction to change the transmission state to D.

As indicated the rotary knob 2 is in addition formed as a mono-stable push button which can be depressed from the mono-stable state to perform shift operations for the transmission or other functions as will be explained in more detail below.

The mono-stable shift button 4 can be actuated by shifting it from the mono-stable position to the left hand side to shift the transmission to the state N.

The base surface of the shift unit surrounding the rotary knob 2 and the shift button 4 are provided with symbols R, D and N which can be illuminated selectively to indicate the current state of the transmission. The rotary knob 2 is further provided with a display on its upper surface to display a state of the transmission or available functions which can be carried out by rotating or depressing the rotary knob 2, as will be explained further below.

The shift-by-wire shift unit further more comprises sensors and control circuitry for generating control signals to be sent to the transmission on the basis of the sensed input operations on the rotary knob 2 and shift button 4. The control circuitry also receives sensor input regarding the movement state of the vehicle, in particular whether the vehicles is at rest: The vehicle is assumed to be at rest if the sensed velocity is below a threshold velocity. The control circuitry is arranged to allow certain shift commands only when the vehicle is at rest. For certain shift commands (for example from P to D or R) the control circuitry in addition requires that the brake pedal is pressed by the driver. In addition the control circuitry is arranged to perform control of the illumination of the symbols R, D and N and of the display on the rotary knob 2. The hardware of such control circuitry and sensors for generating shift-by-wire commands are known as such and will not be discussed in further detail here. However, the functionality of the shift unit and its way of operation that are achieved by adapting and programming the control circuitry are part of the invention and will now be described in the following example of operating the shift-by-wire shift unit of the preferred embodiment.

Figure 2:
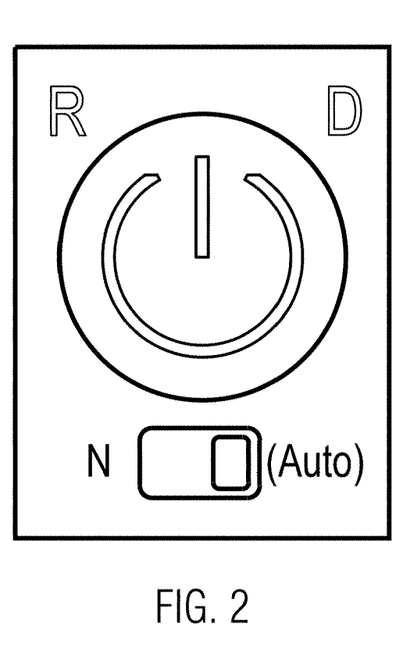
FIGS. 2 to 10 are schematical views of the shift-by-wire shift unit of the embodiment shown in FIG. 1 illustrating a sequence of operations when the shift-by-wire unit is actuated by the driver.

In the state of the shift-by-wire shift unit shown in FIG. 2 the driver has entered the car and placed the key in a position to be sensed. In this situation the engine of the car can be started, and the control circuitry in the shift unit controls the display of the rotary knob 4 to display a start symbol which is formed by an open circle with a straight line segment extending in the open area of the open circle, as shown in FIG. 2. The display of this start symbol informs the driver in an intuitively clear manner that the start function is available and may be carried out by depressing the rotary knob 2.

Figure 3:
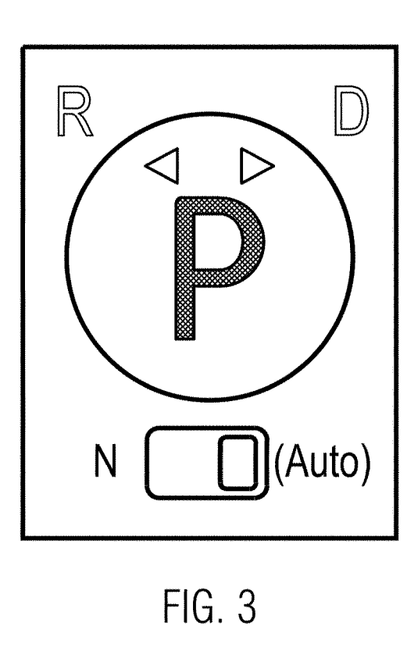

After the engine has been started by depressing the rotary knob 2 the shift unit is in a state as illustrated in FIG. 3. The control circuitry of the shift unit now causes the display on the rotary knob to show a large symbol P illuminated which is intended to show the driver that after starting the engine the transmission is initially in the state P. Furthermore, the control circuitry is arranged to show a first arrow pointing in a first direction in which the rotary knob can be rotated to change the transmission state to R. The first arrow points to the symbol letter R on the base next to the rotary knob at top left of the rotary knob. The display further shows a second arrow pointing in a second direction opposite to first direction and towards a symbol D at the top right of the rotary knob on the base. The display of these two arrows is intended to inform the driver in an intuitive manner that a change to R and D is possible by rotating the rotary knob in the first and second directions, respectively. The control circuitry of the shift unit is arranged to generate the control signals to shift to R or D only once sensors have signaled that the brake is pressed.

Figure 4:
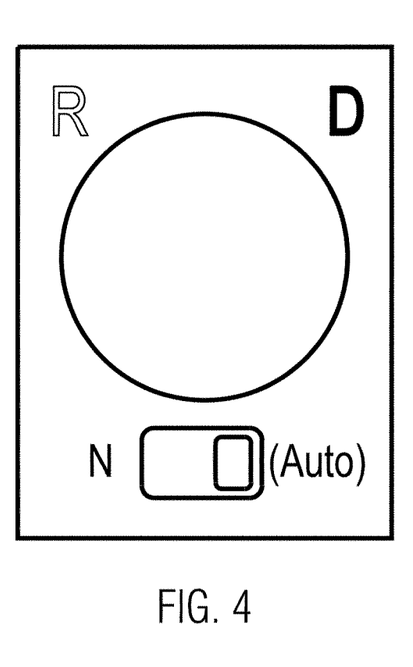

In the present example the driver is pressing the brake pedal, and now wants to drive in forward direction. Starting from the situation as shown in FIG. 3 the driver for this purpose rotates the rotary knob in clockwise direction to shift the transmission to the state D, and starts to drive. The resulting state of the shift-by-wire shift unit is shown in FIG. 4. The display on rotary knob shows no symbols since the control circuitry has determined that in this driving state no operation can be performed by rotating or depressing the rotary knob.

In the situation illustrated in FIG. 5 the driver pushed the brake pedal so that the car is at rest (speed zero or approximately zero). The transmission is still in state D which is indicated by the illuminated symbol D in the top right of the rotary knob. In addition the first arrow pointing in the first direction towards the symbol R is displayed to indicate that the shift unit could be operated to shift to transmission state R by rotating the rotary knob in the indicated anti-clockwise direction. Furthermore, the control circuitry causes the display to show a large the symbol P, but with outlines only and not illuminated (to differentiate it from the illuminated symbol P in FIG. 3 which indicates the transmission state P), and furthermore a small symbol P besides the large symbol P which are intended to indicate that the operation to switch to transmission state P is available by depressing the rotary knob. In addition shift button 4 could be shifted to change to transmission state N.

Figure 6:
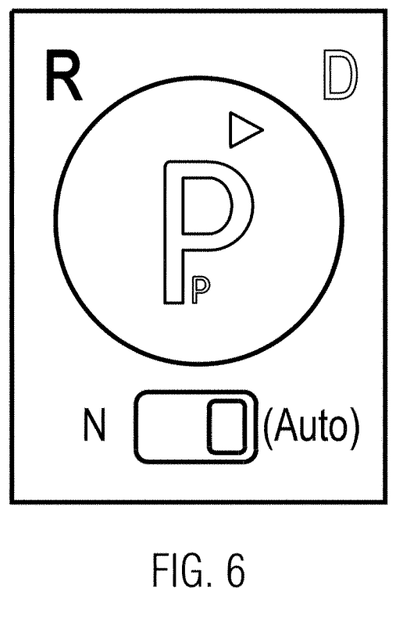

In this situation the driver intends to drive in reverse direction, and consequently, rotates the rotary knob in anti-clockwise direction as indicated by the first arrow pointing to R. The resulting configuration of the shift unit is shown in FIG. 6. The symbol R to the top left of the rotary knob is illuminated to indicate that the transmission is in state R. The brake pedal is still pressed, and the vehicle is at rest. In this situation the control circuitry controls the display to show a large symbol P with outlines and without illumination and a small symbol P besides it to indicate that a change to the transmission state P is available by depressing the rotary knob.

Figure 7:
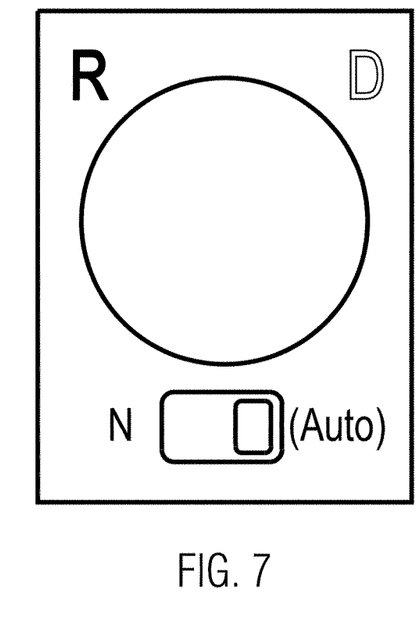

FIG. 7 shows the situation when the driver has released the brake pedal and is driving in rearward direction. The state of the transmission is indicated by illuminating the symbol R at the top left of the rotary knob. No symbols are shown on the display on the rotary knob since in this situation no functions can be performed by rotating or depressing the rotary knob.

Figure 8:
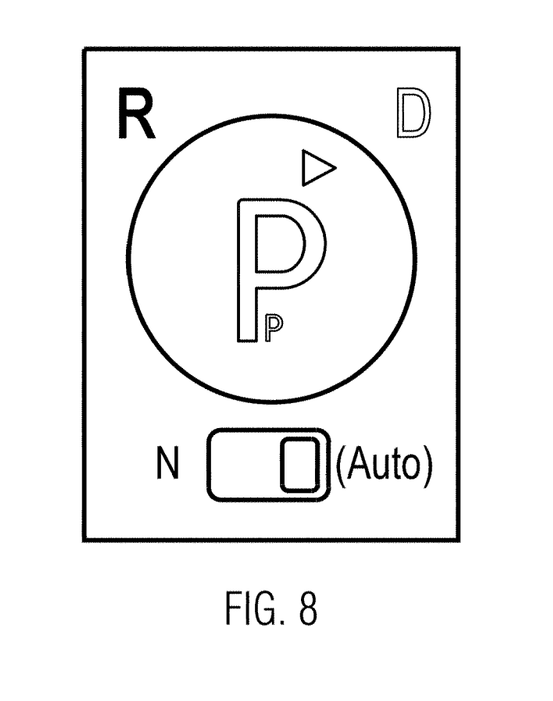

The driver stopped the car again and keeps the brake pedal pushed. The resulting situation is illustrated in FIG. 8. The symbol R remains illuminated since the transmission is still in transmission state R. On the display of the rotary knob the second arrow is shown pointing towards the symbol D, indicating that the transmission state D is available for selection by rotating the rotary knob in clockwise direction. Furthermore, the control circuitry causes the display to display a large symbol P with outlines only and a small symbol P besides it in order to indicate that a change to the transmission state P can be performed by depressing the rotary knob. Thus, the transmission can be changed from the state R to any of the states D, P and N. In addition it should be noted that direct transitions between R and D are possible which is useful when parking the car when little maneuvering space is available.

The driver now has positioned the car in the parking space, the transmission still being in R and the brake pedal is still pressed which situation is shown in FIG. 8. The driver wants to put the transmission into P which is done by depressing the rotary knob which shows the large symbol P in outlines and the small symbol P besides it to indicate this shift option.

Figure 9:
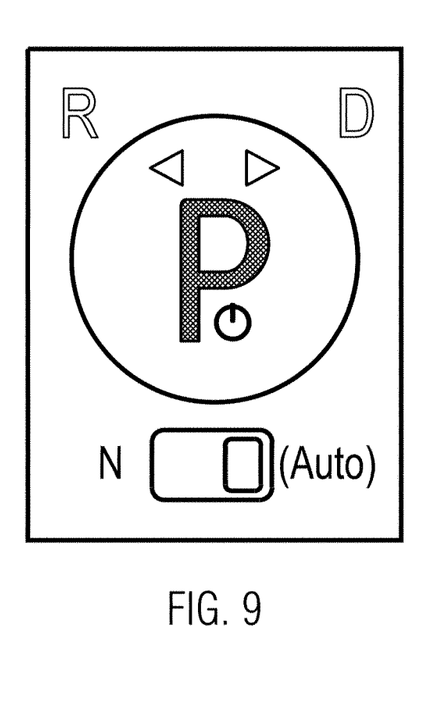
Figure 10:
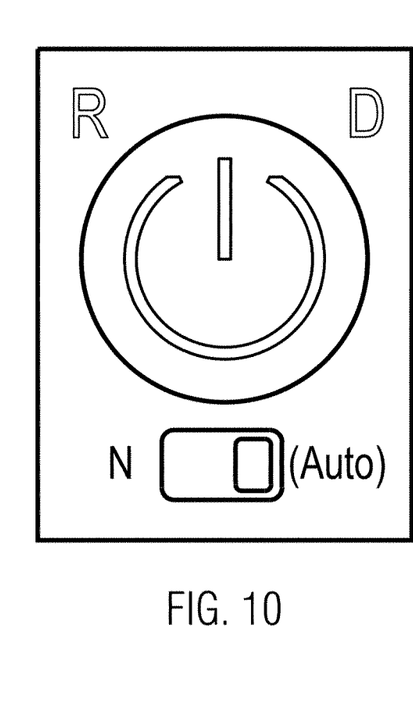

Once the rotary knob 2 has been pressed the control circuitry controls the display to show the symbols as illustrated in FIG. 9. The illuminated first and second arrows pointing to the symbols R and D, respectively, indicate that the transmission can be shifted to the transmission states R and D, respectively. The large illuminated symbol P indicates that the current transmission state is P. The small stop symbol next to the large illuminated P is intended to indicate that turning off the engine may be carried out by depressing the rotary knob 4. When the driver now wants to turn off the engine, he or she pushes on the rotary knob 2 to depress it which causes the control circuitry to generate a stop signal which causes the engine to stop. After that the control circuitry of the shift unit controls the display to show a large start symbol again, as shown in FIG. 10 which indicates that the function to start the engine can be carried out by pushing on the rotary knob 2.

The present invention allows to design a shift-by-wire shift unit in a very compact and space saving manner with two buttons to control the transmission and to change to any of the states P, R, N and D. In the preferred embodiment a mono-stable rotary know 2 and a mono-stable shift button 4 are utilized for this purpose.

In addition the transmission can be controlled very efficiently and very conveniently for the driver in situations were frequent changes from R to D and vice versa are needed, i.e. when maneuvering in a parking space. When the car is at rest a change from R to D is accomplished by a single rotation of the rotary knob, and a change back from D to R again is achieved by a single opposite rotation of the rotary knob.

In a preferred embodiment the functionality of the shift unit can be extended as described above to integrate the functions of turning on and turning off of the engine of the car which can be achieved with the already present two mono-stable buttons as described above.

In this preferred embodiment the driver can turn off the engine only via the transmission state P as an intermediate state which is indicated by the large illuminated symbol P in the display of the rotary knob. Thus, when the engine is being turned off the driver is assured that the transmission state is P, and there can be no irritation for the driver whether or not he has brought the transmission to P when the engine is turned off.

There are, of course, many alternative arrangements compared to the embodiment discussed in connection with FIGS. 2 to 10.

In the embodiment of FIGS. 2 to 10 for example the symbols for the states R and D could be backlit letters in the surface of the base on top of the rotary knob 2. Alternatively, the symbols R, D and N could be displayed on display screen areas provided at the locations shown on the surface of the base next to the rotary knob 2. The display of the symbols R, D and N could then be completely turned off (not visible anymore) when the engine of the vehicle is turned off.

Figure 11:
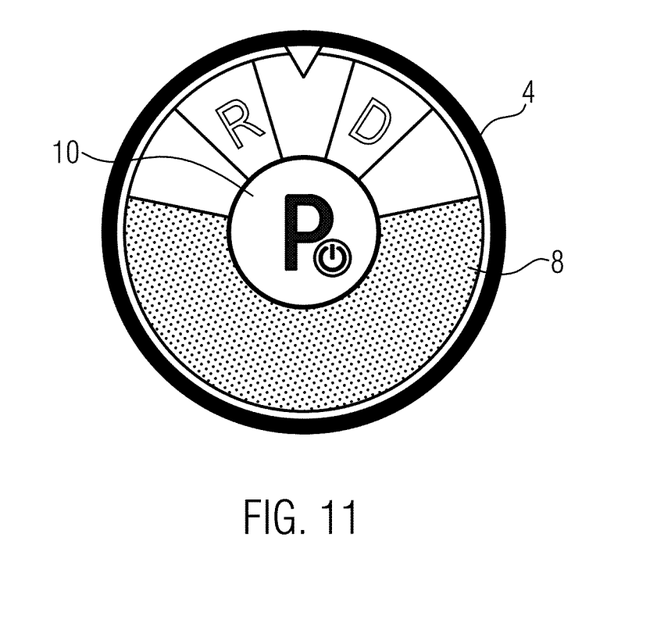
FIG. 11 is a schematic view of an alternative embodiment of a rotary knob of a shift-by-wire shift unit.

Alternatively, the visual display of the R and D states could also be integrated into the display on the rotary knob 2. In this case the R and D symbols would be displayed on the display within the periphery of the rotary knob. Then the rotary knob could be formed by a rotary outer rim or ring as shown in FIG. 11. This outer ring is then arranged as a mono-stable outer ring having an indicator pointing to the center. The central display area within the outer ring could be a uniform circular display which is not rotatable. Then the outer ring 4 could be rotated towards the symbol R and D, respectively which would then be highlighted if any of the states has been reached. The circular display within the outer ring could be subdivided in different portions 8 and 10 in which various state and operation information is displayed. The central circular display within the outer ring could be the upper face of a depressible push-button such that the display as a whole can be pushed down with respect to the outer ring to provide the button element for shifting to P. Alternatively, only an inner portion 10 could be formed as a depressible push-button.

Figure 12:
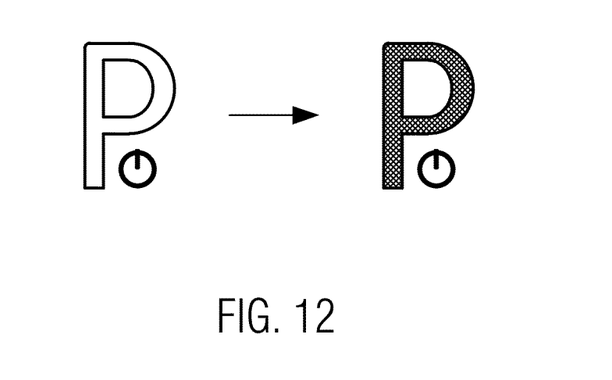
FIG. 12 is a schematic view of display operation of an alternative embodiment of a shift-by-wire shift unit.

As a further alternative, the embodiment described with respect to FIGS. 2 and 10 could be modified such that the display indicates also in the states R, D and N how the turn off function can be reached. This information is useful for first time users, for example of a rental car, who look for the turn off button when the shift unit is still in R, D or N and the brake pedal is pressed. This could for example be achieved by displaying the turn off symbol next to the P symbol already in the state shown in FIG. 8. This is schematically shown in FIG. 12 which shows the central portion of the display and the transition of the states described above in connection with the transition between FIGS. 8 and 9. On the left hand side in FIG. 12 the situation as in FIG. 8 is indicated, i.e. the transmission is still in R (not shown in FIG. 12). The large symbol P is shown with outlines only to indicate that the state P can be reached by depressing the rotary knob, but already in this state the small turn off symbol is displayed next to it to indicate that the turn off function will also be available here. After the rotary knob has been depressed the central display shows the symbols as on the right hand side of FIG. 12, i.e. a large symbol P illuminated to indicate the transmission is in P and a small turn off symbol next to it. This is intended to inform the driver that the engine may be turned off by depressing the rotary knob once again.

The invention claimed is:

1. A shift-by-wire shift unit for shifting a transmission of a vehicle between R, N, D and P states, including a mono-stable selector element that can be moved in opposite directions, wherein the shift arrangement is arranged such that the transmission states R and D can be reached by moving the selector element horizontally from the mono-stable position in a first direction and in a second, opposite direction, respectively, and including a separate input element for change to transmission state N, wherein the shift unit is arranged such that the transmission state is changeable from D to R directly by moving the selector element in the first direction, and from R to D directly by moving the selector element in the second, opposite direction, and the selector element includes a button element, and the shift unit is arranged such that, when the vehicle is at rest and the transmission is in D or R, actuating the button element effects a change to the transmission state P.

2. The shift-by-wire shift unit according to claim 1, wherein the button element is a vertically depressible mono-stable push button provided on the selector element.

3. The shift-by-wire shift unit according to claim 1, wherein the button element is provided by arranging the selector element as a vertically depressible mono-stable push button.

4. The shift-by-wire shift unit according to claim 1, wherein the button element is formed by a touch screen area on the upper surface of the selector element, the touch screen element being actuated by touching it with one or more fingers.

5. The shift-by-wire shift unit according to claim 1, wherein the shift unit is arranged such that the button element for changing to P has the further function to allow to turn the engine on and off, respectively, by actuating the same button element when the shift unit is in P and the engine is off and on, respectively.

6. The shift-by-wire shift unit according to claim 1, wherein the shift unit is arranged such that, when the engine for driving the vehicle is turned off, actuating the button element is starting the engine, and, when the transmission state is P and the engine is running, actuating the button element is turning off the engine.

7. The shift-by-wire shift unit according to claim 1, wherein a top surface of the selector element is provided with a display, and the shift unit is arranged to display a large symbol P when the engine is running and the transmission state is P, and to display a modified symbol P, when the transmission state is R, D or N and the car is at rest with the engine running, to indicate that the transmission state can be changed to P by depressing the selector element.

8. The shift-by-wire shift unit according to claim 7, wherein the shift unit is arranged to display, when the transmission state is P and the engine is running, on the display a first arrow pointing in the first direction to a symbol R next to the selector element and a second arrow pointing in the second direction to a symbol D next to the selector element to indicate that the transmission state can be changed to R and D by moving the selector element in the first and second direction, respectively.

9. The shift-by-wire shift unit according to claim 7, wherein the shift unit is arranged to display a start symbol on the display when the engine is turned off to indicate that depressing the selector element is available to start the engine, and to display a stop symbol on the display when the transmission state is P and the engine is running to indicate that depressing the selector element is available for turning off the engine.

10. The shift-by-wire shift unit according to claim 1, wherein the selector element is a rotary knob which can be rotated from the mono-stable position in clockwise and anti-clockwise direction to perform the horizontal movements in the first and in the second, opposite direction, respectively.

11. The shift-by-wire shift unit according to claim 1, wherein the selector element is a shift button that can be shifted linearly in opposite directions in order to perform the horizontal movements in the first direction and in the second, opposite direction, respectively.

12. The shift-by-wire shift unit according to claim 2, wherein the button element is provided by arranging the selector element as a vertically depressible mono-stable push button.

13. The shift-by-wire shift unit according to claim 12, wherein the button element is formed by a touch screen area on the upper surface of the selector element, the touch screen element being actuated by touching it with one or more fingers.

14. The shift-by-wire shift unit according to claim 4, wherein the shift unit is arranged such that the button element for changing to P has the further function to allow to turn the engine on and off, respectively, by actuating the same button element when the shift unit is in P and the engine is off and on, respectively.

15. The shift-by-wire shift unit according claim 14, wherein the shift unit is arranged such that, when the engine for driving the vehicle is turned off, actuating the button element is starting the engine, and, when the transmission state is P and the engine is running, actuating the button element is turning off the engine.

16. The shift-by-wire shift unit according to claim 5, wherein the shift unit is arranged such that, when the engine for driving the vehicle is turned off, actuating the button element is starting the engine, and, when the transmission state is P and the engine is running, actuating the button element is turning off the engine.

* * * * *